UNITED STATES PATENT OFFICE.

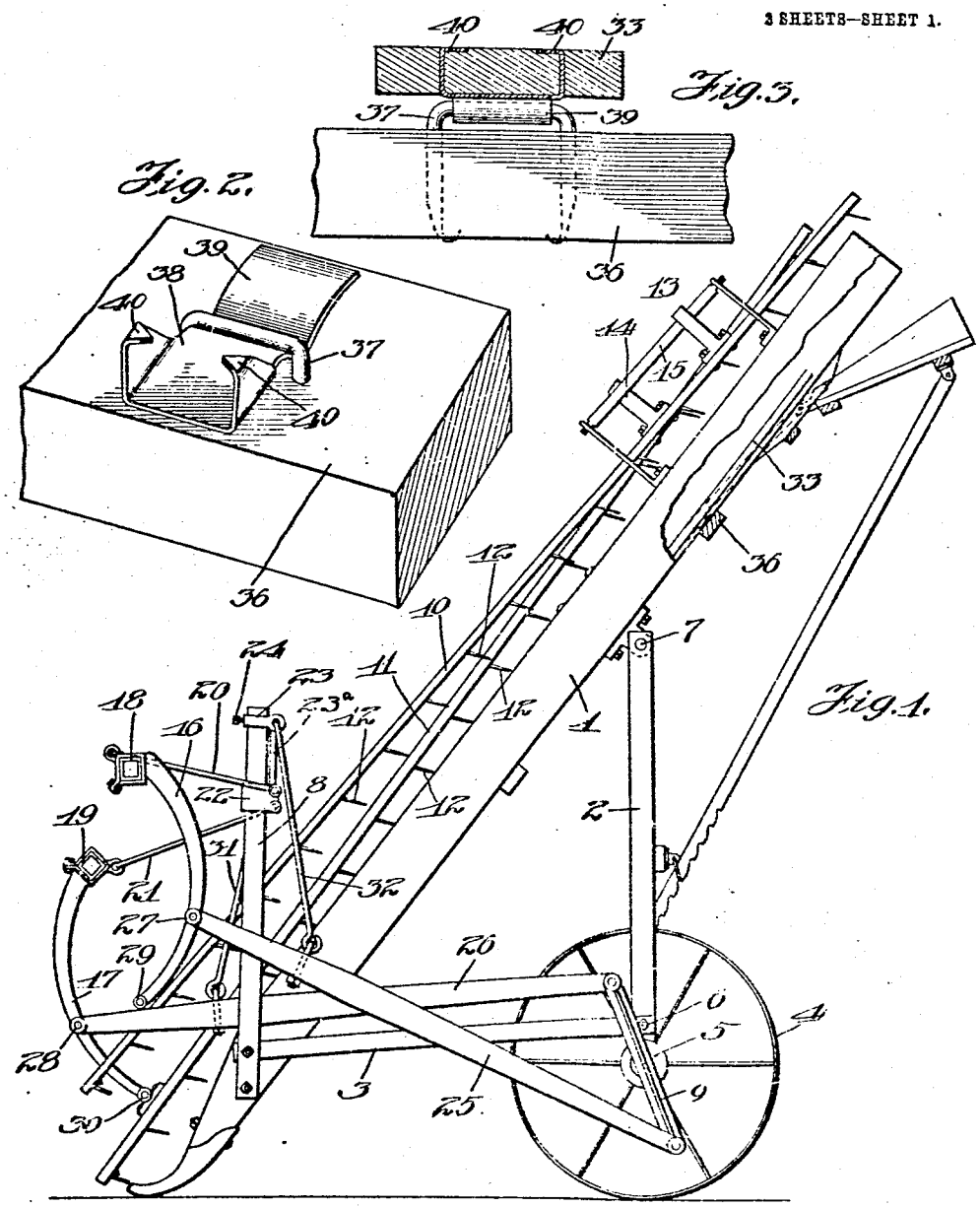

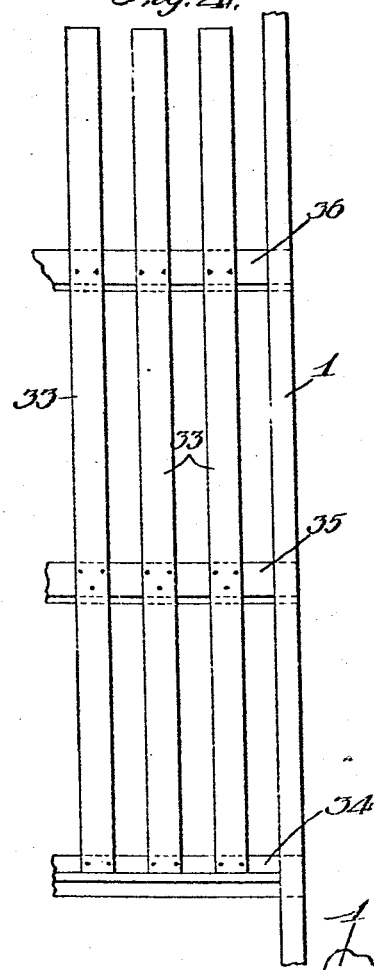
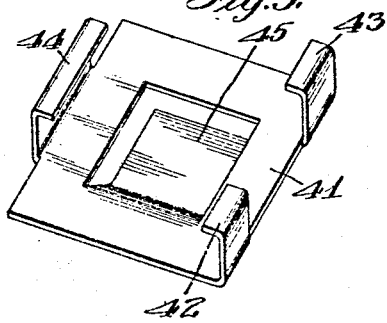
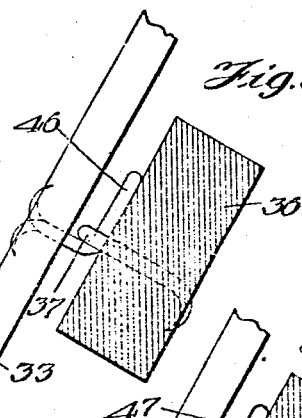
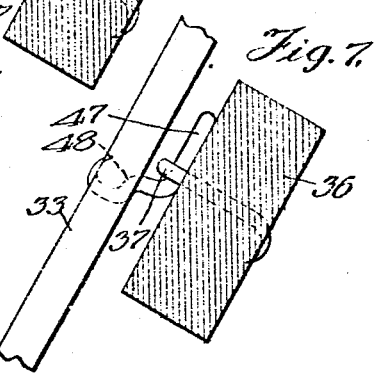
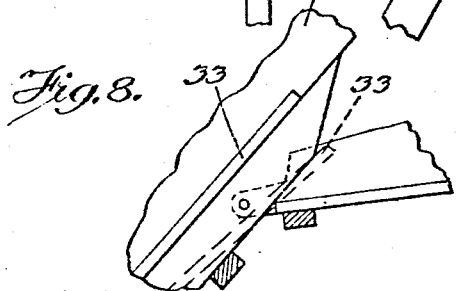

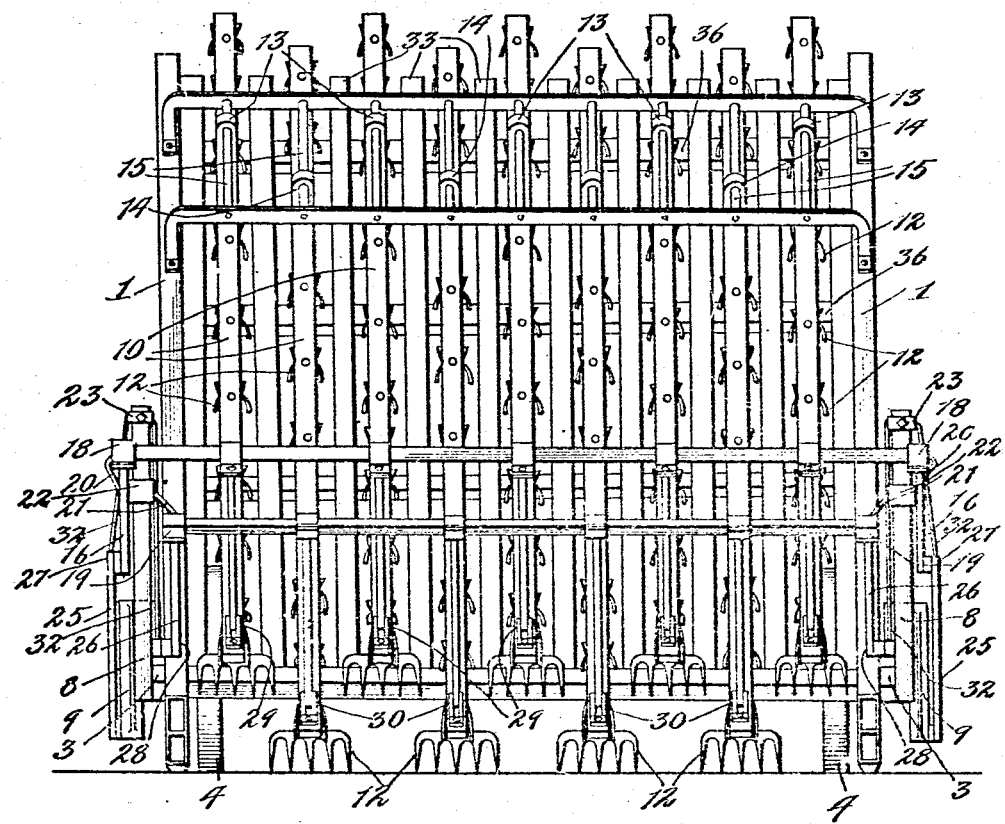

JOSEPH DAIN, OF OTTUMWA, IOWA.

HAY-LOADER.

No. 905,151.  Specification of Letters Patent.  Patented Dec. 1, 1908.

Application filed February 2, 1906. Serial No. 299,130.

*To all whom it may concern:*

Be it known that I, JOSEPH DAIN, a citizen of the United States, residing at Ottumwa, in the county of Wapello and State of Iowa, have invented certain new and useful Improvements in Hay-Loaders, of which the following is a specification, reference being had to the accompanying drawing.

My invention relates to hay loaders, and has for its object to provide certain improvements in loaders of the type illustrated and described in my application, Serial Number 112,621, now pending in the Patent Office. Such loaders comprise a frame mounted on a carriage so that it may be hitched on behind a wagon in such manner that the hay will be delivered to the wagon as the machine progresses. Arranged over said frame are sets of raker-bars, which are mounted so that in operation they move up in close proximity to the frame and return at a considerable distance therefrom, so that they carry up the hay as they move upward but do not come in contact with it during their return movement. Said raker-bars are operated from the main axle by suitable driving mechanism.

My present invention has for its object to provide a new and improved hay loader in which the movement of the lower ends of the raker-bars will be such that the ground rakes—that is, the rakes nearest the ground—will more than rake the ground traversed by the forward motion of the machine,—that is to say, the length of operative stroke of the ground rakes will be greater than the distance traveled by the machine during the time occupied in making such stroke. The advantage of this operation is that it insures the complete raking of the ground, since a margin of safety is provided which insures against leaving unraked spaces.

A further object of my invention is to provide a new and improved construction of hay loader by which the danger of choking at the throat or upper end portion of the loader is avoided.

In hay loaders of the type illustrated in the accompanying drawings, which converge toward the top, so far as I am aware no especial provision has heretofore been made at the throat or upper portion of the loader for passing the same quantity of hay as is taken up at the bottom of the machine where it is wider further than arranging the raker-bars so that they may move up and down or toward and from the deck of the elevator frame. This, however, has been found to be insufficient. As the yield in different fields varies, and the product which is being loaded is seldom evenly distributed over the ground, and the windrows into which the crop may be gathered are not of uniform size, in the absence of especial provision for accommodating unequal masses or bunches of hay at the throat of the loader or upper portion of the elevator frame serious consequences follow. Experience has shown that under said conditions in the loaders as heretofore constructed a large bunch elevated to the throat of the loader is stopped or impeded by the limited space until the upper part of the bunch has become disintegrated or pulled apart by the action of the raker-bars, and that part which is held back during this period is subjected to the motion of the raker-bars which have a beating or threshing effect upon it because of its not moving upward and forward under their action,—the result being that the leaf is destroyed and the stalk broken, thereby damaging the hay. Should the hay continue to be proportionately heavy for a considerable distance, the space between the raker-bars and the slats forming the bed or deck of the elevator frame would become congested or packed until the machine would clog and the drive-wheels slide,—the machine not having sufficient power for driving the raker-bars under said condition of congestion. It may be well to explain that it is impractical to overcome the objections above noted by making the throat of the loader large enough to accommodate the larger bunches of hay for the reason that when working in light hay such portion of the machine would necessarily have to be filled before the hay would commence to pass through it on to the wagon, and the hay so delayed until the space became filled would be subjected to the same action from the raker-bars as when the quantity was too great to pass through the throat without delay.

My present invention provides a construction by which the objections above noted are avoided and ample provision made for accommodating the larger bunches without detracting from the efficiency of the loader where the bunches are small.

In the accompanying drawings I have illustrated my improvements as applied to a loader of the type illustrated in my application above referred to, but it will be understood that my invention is not restricted to machines of that type alone, but may be employed in any other machine to which they are adapted.

In the accompanying drawings,—Figure 1 is a side elevation of a hay-loader embodying my invention, certain parts being broken away; Fig. 2 is a perspective view of a part of the elevator frame, showing one form of clip by which the slats composing the bottom or deck of the elevator frame are secured in position; Fig. 3 is an edge view of the upper crossbar of the elevator frame and one of the slats,—the latter being in section; Fig. 4 is a partial plan view of the elevator frame; Fig. 5 is a perspective view of another form of clip; Figs. 6 and 7 are views illustrating different arrangements of devices for securing the slats of the upper crossbar,—the latter being shown in section; Fig. 8 is a sectional detail, illustrating part of the upper portion of the elevator frame, and Fig. 9 is a rear elevation of my improved hay loader.

Referring to the drawings for a detailed description of the construction therein shown,—1 indicates the loader frame; 2 the upright portions of the carriage; 3 the substantially horizontal portions of the carriage; 4 one of the wheels; and 5 the axle. The portions 2—3 of the carriage are rigidly connected together, as shown at 6 in Fig. 1, and the members 3, one of which is provided at each side of the machine, are secured to the frame 1.

If desired, the members 3 may be made extensible, as shown in my said application, and with that end in view the frame 1 is pivotally mounted at 7 upon the upper end portions of the vertical members 2 of the frame.

The members 2 are pivotally mounted upon the axle so that the loader frame may be rocked about the axle as a center.

8 indicates uprights or standards, one of which is provided at each side of the lower portion of the loader frame 1, as illustrated.

9 indicates double cranks, one of which is provided near each end of the axle 5.

10—11 indicate rake frames composed of a series of raker-bars which carry rake-teeth 12. This construction is fully illustrated in my pending application hereinbefore referred to. At their upper ends the rake frames are supported and guided by brackets 13—14, respectively, which slide on guide-bars 15 carried by the loader frame. At their lower ends the rake frames are provided with arms 16—17, respectively, by which they are connected with transverse bars 18—19, respectively, which serve to unite the component raker-bars of each rake frame into a unified frame, and said bars are connected by links 20—21, respectively with sliding blocks 22 which are mounted on the standards 8, as shown. Said blocks may be vertically adjusted and held at different positions of adjustment by any suitable mechanism, such as sliding collars 23 having set screws 24, the blocks being suspended from said collars 23 by links or other suitable connections 23ª, as shown. Instead of providing set screws 24, suitable mechanism may be employed for facilitating the vertical adjustment of the blocks 22. All these features of construction are fully illustrated and described in my said pending application.

25—26 indicate pitmen, a pair of which are provided at each side of the machine. Said pitmen connect the opposite crank portions of double cranks 9 at each end of the axle with the arms 16—17, respectively,—said pitmen being connected with said arms at points removed from the points at which the said arms are attached to the raker-bars. As illustrated, the pitmen are attached to the arms 16—17 at points 27—28, respectively, while the arms 16—17 are pivotally attached to their respective raker-bars at the points 29—30, respectively.

31—32 indicate links pivotally connected with the collars 23 at their upper ends and with the pitmen 25—26 at their lower ends, as shown. Said links constitute traveling or swinging fulcra for the pitmen, so that said pitmen may reciprocate as well as rock, and control the paths of the rakes. Said paths may be varied by vertically adjusting the collars 23, or equivalent devices to which the links 31—32 may be connected.

It will be observed that, as has been suggested, in many respects the construction illustrated is similar to that shown and described in my pending application,—the important differences, so far as my present application is concerned, being that the pitmen are connected with the raker-bar arms at a distance from the points at which said arms are connected with the raker-bars, such distance being greater than the difference between the length of the cranks 9 and the radius of the supporting wheels by which construction the raker-bar is given a longer motion or sweep over the ground,—the additional distance gained being substantially equal to the distance between the point where the pitman attaches to the raker-bar arm and the point where said arm attaches to the raker-bar.

As shown in Figs. 1 and 4, the bottom of the elevator frame 1 is composed of longitudinally-disposed slats 33, set a distance apart and supported by crossbars 34—35—36,—the latter being secured to the side of the elevator frame. The uppermost crossbar 36 is placed a considerable distance from the upper ends of the slats 33, so that the upper ends of said slats may freely be flexed or bent downward to increase their distance from the raker-bars. This is indicated in dotted lines in Fig. 1. By this construction when large bunches of hay reach the upper portion or throat of the loader the upper ends of the slats 33 yield under the increased strain to which they are subjected, permitting the hay to pass unimpeded. Obviously, also, they accommodate themselves to smaller bunches. In order to provide greater flexibility for the slats they are not rigidly secured to the crossbar 36 but are so secured as to have a limited amount of play thereon. To this end I have devised devices of various forms.

In the construction illustrated in Fig. 2 I provide the crossbar 36 with a staple 37 which extends longitudinally thereof, and I provide the slats 33 at their under sides with clips 38 having tongues 39 adapted to slip under the staple 37 in the manner shown in Fig. 2. The clips 38 are provided with projections 40 at opposite sides, which extend through or embrace the slats and engage them firmly.

In Fig. 3 I have illustrated the projections 40 as extending through one of the slats 33. In use the tongue 39 projects upward longitudinally of the slat, and, when in engagement with the staple, serves to hold the slat against lateral movement, but permits longitudinal movement of the slat, so that when the slat is bent downward I utilize the elasticity of a portion of the slat below the upper crossbar 36 as well as of the portion above it; whereas, if the slat were rigidly secured to the crossbar 36, this result would not ensue.

In Fig. 5 I have shown a modified arrangement of clip consisting of a plate 41 having projections 42, 43 and 44, which embrace the slat, and a tongue 45 formed by making a U-shaped slit in the plate 41 and pressing down the central portion thereof.

In Fig. 6 I have shown a clip formed of a staple 46 bent at right angles so that the rounded portion thereof is substantially parallel with and at a distance from the lower face of the slat. A similar construction is shown in Fig. 7, in which a staple 47 is bent twice substantially at right angles forming shoulders 48 which prevent displacement of the clip with reference to the slat. By securing the slats of the upper crossbar in the manner above described I assist very materially in securing the results desired, since the staple to which the clip is hooked forms a fulcrum over which the slat rocks, thereby increasing its flexibility and adding to its efficiency by giving it a larger scope or movement. A further advantage of this construction is that the elevator frame may readily be taken apart and put together without danger of damaging it as would be the case if the parts were nailed together, and besides there is no danger of interfering with the progress of the hay, since the clips being on the under side of the slats they are out of the way. Nails, on the other hand, would be apt to work loose owing to the springing up and down of the upper ends of the slats and would then project into the path of the hay and impede its progress.

So far as I am aware, I am the first in the art to provide a construction by which the stroke of the ground-rakes is made greater than the distance normally traveled by the machine during said stroke. I therefore claim this feature in the broadest manner possible, and wish it to be understood that my invention is not restricted to details of the construction illustrated and described, except in so far as they are specifically claimed, but includes generically the subject-matter of the broader claims.

That which I claim as my invention and desire to secure by Letters Patent is,—

1. A hay-loader having a loader frame, wheels supporting said frame, a crank shaft having its axis concentric with the wheel axles, a reciprocating rake, and a pitman fulcrumed on the loader frame and connected at one end with said rake and at the other end with said crank shaft for reciprocating said rake.

2. A hay-loader having a loader frame, wheels, a crank shaft having its axis coincident with the wheel axles, a reciprocating rake, a pitman connected with said crank shaft and with said rake for reciprocating the rake, and a traveling fulcrum for said pitman.

3. A hay-loader having a loader frame, wheels supporting said frame, a crank having its axis coincident with the wheel axles, a reciprocating rake, a pitman fulcrumed on the loader frame and connected at one end with said crank, and means connecting the other end of said pitman with said rake and acting to increase the throw of the rake.

4. A hay-loader having a loader frame, wheels supporting said frame, a crank having its axis coincident with the wheel axles, a reciprocating rake, connections pivotally connecting the lower end portion of the rake with the loader frame, said connections including an arm; and a pitman connected with said crank and connected with said arm intermediate the ends thereof for reciprocating the rake.

5. A hay-loader having a loader frame, wheels supporting said frame, a rake adapted to reciprocate over said frame, a crank having its axis coincident with the wheel axles, arms pivotally connected with said rake and extending upward therefrom, means pivotally connecting said arms with the loader frame, and pitmen connected with said crank and with said arms.

6. A hay-loader having a loader frame, wheels supporting said frame, a rake adapted to reciprocate over said frame, a crank having its axis coincident with the wheel axles, arms pivotally connected with said rake and extending upward therefrom, means pivotally connecting said arms with the loader frame, pitmen connected with said crank and with said arms, and fulcra for said pitmen.

7. A hay-loader, comprising a loader frame, uprights at opposite sides thereof, reciprocating raker-bars, arms pivotally connected with the lower end portions of said raker-bars and extending upward therefrom, links connecting the upper end portions of said arms with said uprights, wheels under said loader frame, a crank having its axis coincident with the wheel axles, and pitmen connected with said crank and with said arms for reciprocating said raker-bars.

8. A hay-loader, comprising a loader frame, uprights at opposite sides thereof, reciprocating raker-bars, arms pivotally connected with the lower end portions of said raker-bars and extending upward therefrom, links connecting the upper end portions of said arms with said uprights, wheels under said loader frame, a crank having its axis coincident with the wheel axles, and pitmen connecting said crank with said arms.

9. A hay-loader, comprising a loader frame, a rake, wheels, a crank shaft having its axis coincident with the wheel axles, the cranks of said crank shaft being shorter than the radius of the wheels, a reciprocating rake, and pitmen fulcrumed on the loader frame and connected with said cranks for actuating said rake.

10. A hay-loader, comprising a loader frame, wheels, a crank shaft having its axis coincident with the wheel axles, the cranks of said crank shaft being shorter than the radius of the wheels, a reciprocating rake, swinging arms pivotally connected with said rake and extending upward therefrom, and pitmen connected with said cranks and pivotally connected with said arms at a distance from the rake.

11. A hay-loader, comprising an elevator frame, a carriage supporting the upper portion thereof, reciprocating rake frames movable over the elevator frame, each of said rake frames having a cross-bar extending transversely thereover, standards carried by the elevator frame, links connecting said cross-bars with said standards, cranks rotated by the forward movement of the carriage, pitmen connected with said cranks, and arms connected with said cross-bars and with said rake frames, said arms being connected with said pitmen at a point between the rake frames and said cross-bars.

12. A hay-loader, comprising an elevator frame, a carriage supporting the forward portion thereof, reciprocating rake frames movable over said elevator frame, said rake frames having transverse bars extending thereover, arms connecting said transverse bars with the rakes, said arms being pivotally connected with the rakes at their lower ends, standards carried by the elevator frame, means connecting said transverse bars with said standards, cranks operated by the forward motion of the loader, and pitmen connected with said cranks and with certain of said arms between the pivotal connection thereof with the rakes and the transverse bars to which said arms are connected.

13. A hay-loader, comprising an elevator frame, a carriage supporting the forward portion thereof, reciprocating rake frames movable over said elevator frame, said rake frames having transverse bars extending thereover, arms connecting said transverse bars with the rakes, said arms being pivotally connected with the rakes at their lower ends, said elevator frame comprising standards carried thereby, means connecting said transverse bars with said standards, cranks operated by the forward motion of the loader, and pitmen connected with said cranks and with certain of said arms between the pivotal connection thereof with the rakes and the transverse bars to which said arms are connected, said pitmen being fulcrumed on the elevator frame.

14. A hay-loader, comprising hay-elevating mechanism, and an elevator frame having a deck composed of longitudinal slats, means supporting the upper portions of said slats, and means detachably connecting said slats with said supporting means.

15. A hay-loader, comprising hay-elevating mechanism, and an elevator frame having a deck composed of longitudinal slats, and supporting means for the upper portions of said slats, said slats being movably connected with said supporting means.

16. A hay-loader, comprising hay-elevating mechanism, and an elevator frame having a deck composed of longitudinal slats, and supporting means for the upper portions of said slats, said slats being movably connected with said supporting means and the upper ends of said slats extending beyond said supporting means.

17. A hay-loader, comprising hay-elevating mechanism, an elevator frame having a deck composed of longitudinal slats, means under said slats for supporting the same, and clips on the under surfaces of said slats for securing them to said supporting means.

JOSEPH DAIN.

Witnesses:
J. D. BROWNING,
W. G. DUFFIELD.